United States Patent
Moore et al.

(10) Patent No.: US 7,125,010 B2
(45) Date of Patent: Oct. 24, 2006

(54) WORK PIECE HOLDING ARRANGEMENT

(75) Inventors: John Moore, Nottingham (GB); Nabil Gindy, Loughborough (GB)

(73) Assignee: Rolls-Royce plc, London (GB)

( * ) Notice: Subject to any disclaimer, the term of this patent is extended or adjusted under 35 U.S.C. 154(b) by 212 days.

(21) Appl. No.: 10/917,408

(22) Filed: Aug. 13, 2004

(65) Prior Publication Data
US 2005/0082731 A1 Apr. 21, 2005

(30) Foreign Application Priority Data
Aug. 22, 2003 (GB) ................... 0319727.4

(51) Int. Cl.
*B25B 5/16* (2006.01)
(52) U.S. Cl. ............... 269/266; 269/21; 81/185
(58) Field of Classification Search ......... 269/266, 269/21, 289 R, 267, 53, 20, 309; 81/185
See application file for complete search history.

(56) References Cited

U.S. PATENT DOCUMENTS

| | | | | |
|---|---|---|---|---|
| 1,453,176 A | * | 4/1923 | Perrine | 269/266 |
| 3,698,267 A | * | 10/1972 | Denney | 81/185 |
| 3,983,632 A | | 10/1976 | Halstead | |
| 4,200,272 A | * | 4/1980 | Godding | 269/26 |
| 4,936,560 A | | 6/1990 | Barozzi | |
| 5,190,273 A | * | 3/1993 | Salvagnini | 269/309 |
| 5,622,090 A | * | 4/1997 | Marks | 81/185 |
| 5,984,293 A | * | 11/1999 | Abrahamson et al. | 269/266 |
| 2005/0082731 A1 | * | 4/2005 | Moore et al. | 269/266 |

FOREIGN PATENT DOCUMENTS

| | | |
|---|---|---|
| GB | 1 584 445 SP | 2/1981 |
| GB | 2 205 258 A | 12/1988 |

* cited by examiner

*Primary Examiner*—Lee D. Wilson
(74) *Attorney, Agent, or Firm*—W. Warren Taltavull; Manelli Denison & Selter PLLC

(57) ABSTRACT

A work piece holding arrangement (10) includes an array of engagement elements (12) for engaging a work piece. The arrangement (10) also includes an actuator (34) for moving a plurality of the engagement elements (12) into engagement with the work piece, and a deformable clamping member (26) to clamp the engagement elements (12). The clamping member (26) is deformable between a clamping condition in which at least some of the engagement elements (12) are engaged by the clamping member (26) and clamped in respective positions, and a non-clamping condition in which the engagement elements (12) can move.

27 Claims, 4 Drawing Sheets

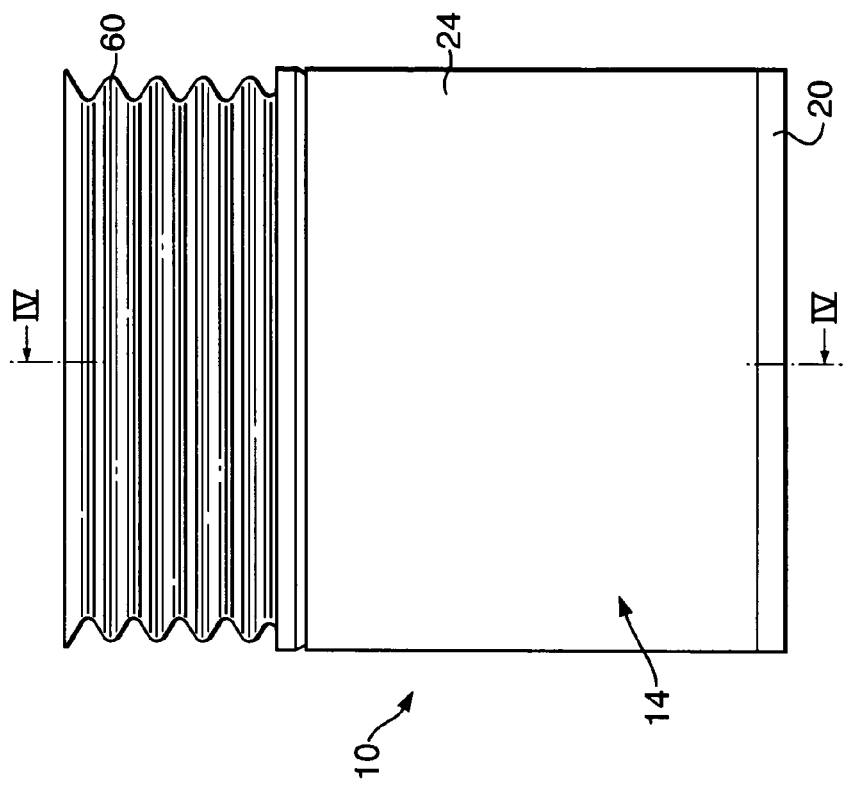
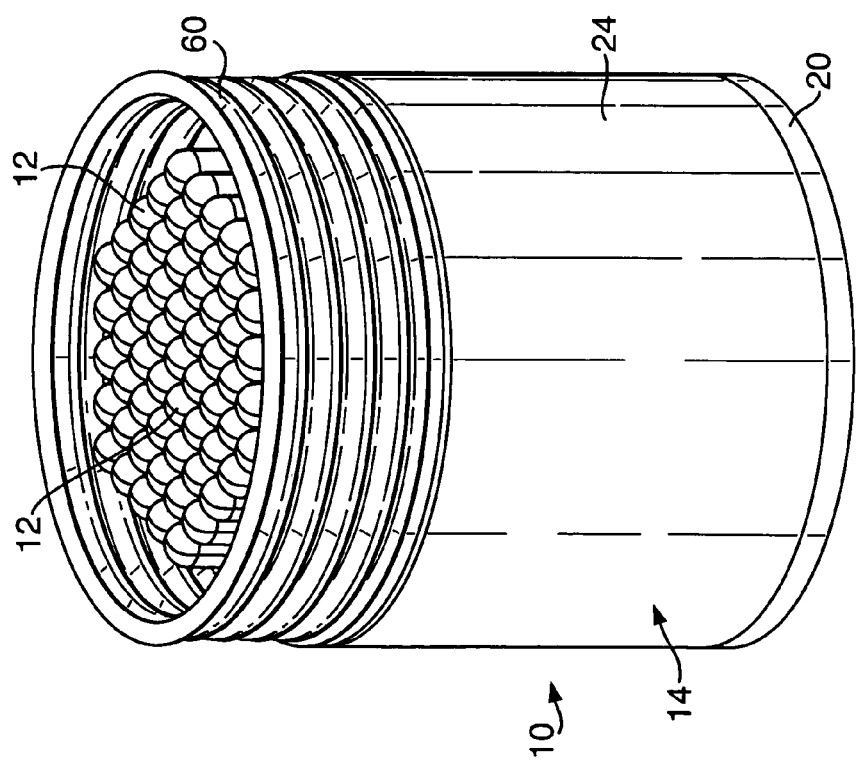

WORK PIECE HOLDING ARRANGEMENT

FIELD OF THE INVENTION

This invention relates to work piece holding arrangements. More particularly, but not exclusively, the invention relates to work piece holding arrangements for holding blades of a rotary component of a gas turbine engine.

BACKGROUND OF THE INVENTION

During the manufacture of fan, turbine and compressor blades of a gas turbine engine, it is necessary to machine it to exact specifications. In order to effect this machining, the blades have to be held in position. This is currently carried out by tooling which clamps the aerodynamic surfaces of the blades to deform them to the shape of the tool. When the tooling releases the blade, it springs back to its original shape. This can be disadvantageous, because each blade requires its own special tool, and when the blades spring back to their original shape, this can change the position of machine features relative to the blades datum.

SUMMARY OF THE INVENTION

According to one aspect of this invention there is provided a work piece holding arrangement comprising an array of movable engaging members for engaging a work piece, an actuator for moving a plurality of the engagement elements into engagement with the work piece, and a deformable clamping member to clamp the engagement elements, wherein the clamping member is deformable between a clamping condition in which at least some of the engagement elements are engaged by the securing member and clamped in respective positions, and a non-clamping condition in which the engagement elements can move.

Preferably, the work piece holding arrangement includes a support for supporting the engagement element in an outwardly extending array in which each engagement element is generally parallel with each other engaging elements.

Each engagement element may comprise an elongate member movable in its longitudinal direction.

Each engaging element may comprise an inner part and an outer part. The outer part may be telescopically movable over the inner part. This has the advantage, in the preferred embodiment, of reducing the overall height of the device, as compared with prior art devices, and thus provides a space saving benefit.

The inner and outer parts may define a fluid path and each engagement element is movable by the flow of a fluid through the fluid path.

According to another aspect of this invention there is provided an engagement element for use in a work piece holding arrangement comprising an inner part and an outer part, the inner and outer parts being telescopically movable relative to each other, wherein the inner and outer parts define a fluid path and the relative telescopic movement of the inner and outer parts is effected by a flow of a fluid through the fluid path.

The inner and outer parts of each engagement element may comprise cooperable respective stop formations to inhibit the telescopic movement.

The actuator may comprise a fluid supply assembly for supplying said fluid to each engagement element.

The inner part and the outer part may each have a respective proximal end region and a respective distal end region. The proximal end regions of the inner and outer parts may be nearer to the support than the respective distal end regions. The fluid path may extend from an inlet at the proximal end region of the inner part to an outlet at the proximal end region of the outer part.

The fluid path may be substantially devoid of seals, and may instead have a narrow gap in the fluid path to generate a non-positive driving force on each engaging element. This has the advantage in the preferred embodiment of providing a non-positive driving force on each engagement element.

Each engagement element may comprise an inner tubular member defining a first region of the fluid path from the inlet. Each engagement element may include an outer pin member defining a second region of the fluid path to the outlet. The cooperable stop formations may comprise an outwardly extending formation on the inner tubular member, and an inwardly extending formation on the outer pin member.

The arrangement may include a flexible sealing member for sealingly engaging the work piece, and may further include a vacuum application means to apply a vacuum between the engagement elements.

The outwardly extending stop formation may be provided on the distal end region of the inner tubular member. The inwardly extending stop formation may be provided on the proximal end of the outer pin member.

The clamping member may comprise a clamping sleeve extending around the engagement element. The clamping sleeve may be deformable inwardly to engage a plurality of the engagement element.

The securing member may comprise a shaft member arranged centrally of the engagement element. The shaft member may be deformable outwardly to engage a plurality of the holding members in the securing condition.

BRIEF DESCRIPTION OF THE DRAWINGS

An embodiment of the invention will now be described by way of example only, with reference to the accompanying drawings, in which:

FIG. 1 is a perspective view of a work piece holding arrangement;

FIG. 2 is a side view of the work piece holding arrangement shown in FIG. 1;

DETAILED DESCRIPTION OF THE INVENTION

Figure 3:
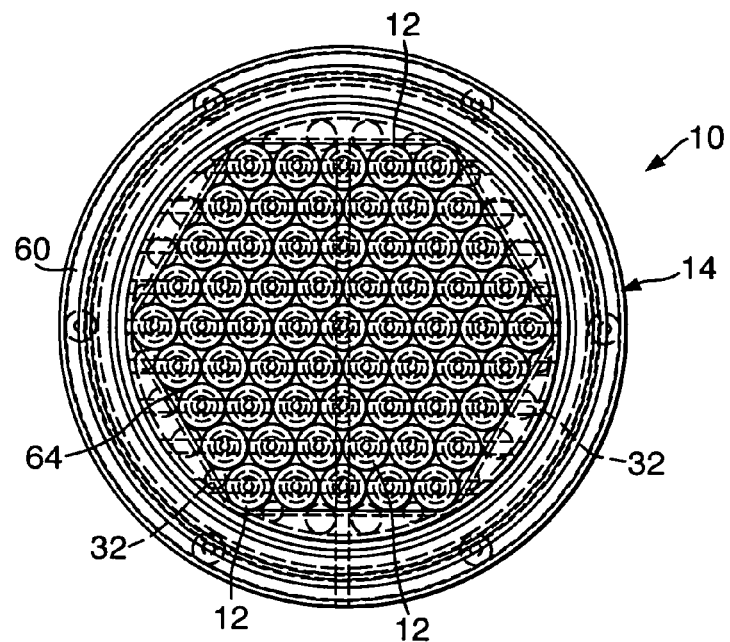
FIG. 3 is a top view of the work piece holding arrangement shown in FIG. 1.
Figure 4:
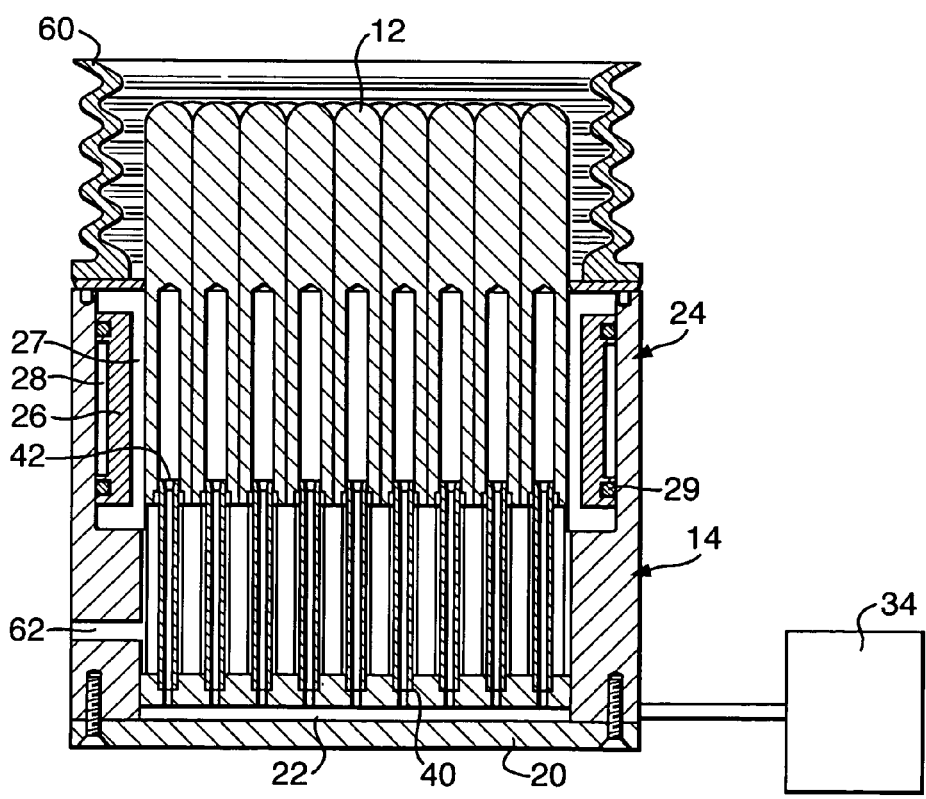
FIG. 4 is a view along the lines IV—IV of the work piece holding arrangement shown in FIG. 2.

Referring to FIGS. 1 to 4 of the drawings, a first embodiment of a work piece holding arrangement 10 is shown which comprises a plurality of elongate telescopic engagement elements 12 and a support 14 for supporting the engagement elements 12. The engagement elements 12 provide a self-aligning hexagonal array of movable pins within the support 14.

The support 14 comprises a base member 20 defining a fluid flow conduit 22 to supply fluid to the tubular members 18, as will be explained below.

A cylindrical wall 24 extends upwardly from the base member 20 and surrounds the array of engagement elements 12.

The cylindrical wall 24 comprises a deformable clamping member in the form of an inwardly deformable flexible annular bushing 26, arranged in an annular indented region 27 of the wall 24. An annular space 28 is defined between the bushing 26 and the wall 24. Seals 29 are arranged in the space 28 to prevent leakage of hydraulic fluid. In addition to the engagement elements 12, the work piece holding arrangement also includes a plurality of fill members 32 of varying sizes to fill at least some of the gaps between the hexagonal array of engagement elements 12 and the bushing 26.

A supply of hydraulic fluid to the annular space 28 causes the bushing 26 to deform inwardly thereby engaging the outermost engagement elements 12 and the fill members 32, and clamping the engagement elements 12 in their position.

The work piece holding arrangement 10 also includes a pneumatic actuator represented diagrammatically at 34 for delivering air under pressure to the fluid flow conduit 22 in the base member 20. Alternatively, the actuator could be a hydraulic actuator.

Figure 8:
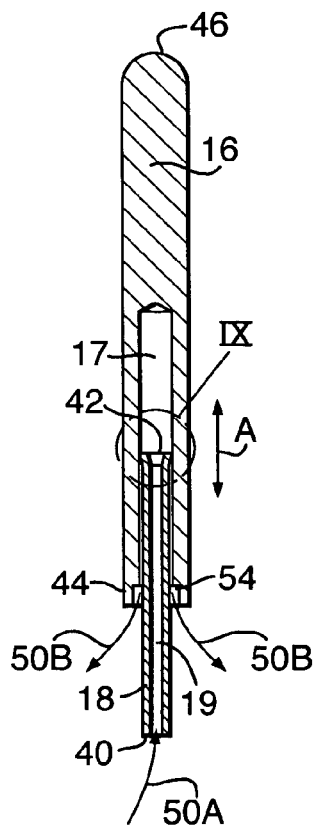
FIG. 8 is a sectional side view of an engagement element for use in the workpiece holding arrangements shown in FIGS. 1 to 6.

One of the engagement elements 12 is shown in FIG. 8 and comprises an outer hollow elongate pin member 16, and an inner tubular shaft 18. The outer pin member 16 defines a central longitudinally extending outer conduit 17, the purpose of which is explained below. The outer pin member 16 is telescopically slidable over the inner tubular member 18 as shown by the double headed arrow A in FIG. 8. The inner tubular member 18 defines a central longitudinally extending inner conduit 19 in communication with the outer conduit 17. The purpose of the inner conduit 19 is also explained below.

Each outer pin 16 can slide along its main longitudinal axis but is constrained in all other axes. Engagement elements around the perimeter are so constrained partially by neighbouring engagement elements 12 and partially by fill members 32.

Figure 9:
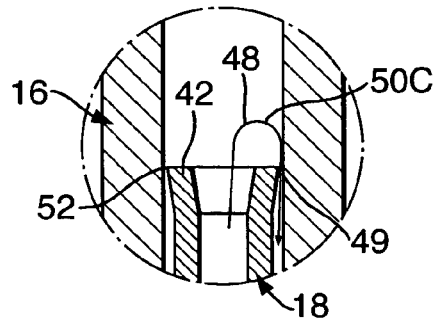
FIG. 9 is a close up view of the region labelled IX in FIG. 8.

Each inner tubular member 18 has a proximal end region 40 at which the tubular member is mounted on the base member 20, and an opposite distal end region 42 spaced from the base member 20. Similarly, the outer pin member 16 has a proximal end region 44 nearest to the base member 20 and a distal end region 46 spaced from the proximal end region 44 of the outer pin member 16. The distal end region 46 of the outer pin member 16 is for engagement with a work piece, as will be described below. A fluid flow path 48 (see FIG. 9) is defined within each engaging element 12 and is provided by the outer and inner conduits 17, 19. The fluid flow path 48 extends from the proximal end region 40 of the inner tubular member 18 to the distal end region 42 of the inner tubular member 18 and thereafter from the inner conduit 19 in the tubular member 18. The fluid (which, in the preferred embodiment, is air) enters the inner conduit 19 within the inner tubular member 18 as shown by the arrow 50A and flows into the outer conduit 17 in the outer pin member 16, as shown by the arrows 50C to exit therefrom at the proximal end region 44 of the outer pin member 16, as shown by the arrows 50B.

In order to prevent the outer pin members 16 sliding off their respective inner tubular members 18, cooperating stop formations 52, 54 are provided. The stop formation 54 is provided on the proximal end region 44 of the outer pin member 16 and extends radially inwardly towards the tubular member 18. The stop formation 52 is provided on the distal end region 42 of the inner tubular member 18 and extends radially outwardly. When the outer pin member 16 reaches the outermost end of its stroke, the stop formations 52, 54 engage each other thereby preventing further outward movement of the pin member 16.

There are no seals within the fluid flow path 48. A bottleneck 49 is provided in the fluid flow path 48 between the stop formation 52 on the inner tubular member 18 and the portion of the outer pin member 16 providing the wall of the outer conduit 17 and thereby the air flows freely all along. The pressure of the fluid is sufficient to move each outer pin member 16 upwards until the distal end region 46 engages a part of the work piece, or until the stop formations 52, 54 engage each other. The fluid is allowed to escape, as shown by the arrows 50 and gently pushes the outer pin member away from the base member 20 to provide a feather touch on the work piece, thereby avoiding deformation of the work piece.

Thus, a supply of air from the pneumatic actuator 34 causes each of the pin members 16 of the engagement elements 12 to slide telescopically outwardly along the respective inner tubular members 18 until distal end region 46 of some of the pin members engage a work piece. When the work piece has been so engaged by the appropriate outer pin members 16, hydraulic fluid is supplied to the space 28 between the bushing 26 and the wall 24 to cause the bushing 26 to deform inwardly thereby clamping the outer pin members 16 in position. Thus, the outer pin members 16 engage the work piece holding it in position for suitable clamping. If desired, the work piece could be held in position by opposed work piece holding arrangements 10 arranged for the respective pin members 16 of each work piece holding arrangement 10 to engage the work piece on opposite sides thereof.

In order to hold the work piece to the engaging elements 12, a flexible sealing member in the form of an annular bellowed vacuum cup 60 is provided. In addition, a bore 62 is defined in the wall 24 via which air can be removed from the spaces 64 between adjacent engaging members 12. The vacuum cup 60 seals against the work piece and a vacuum is applied to hold the work piece in position.

Figure 5:
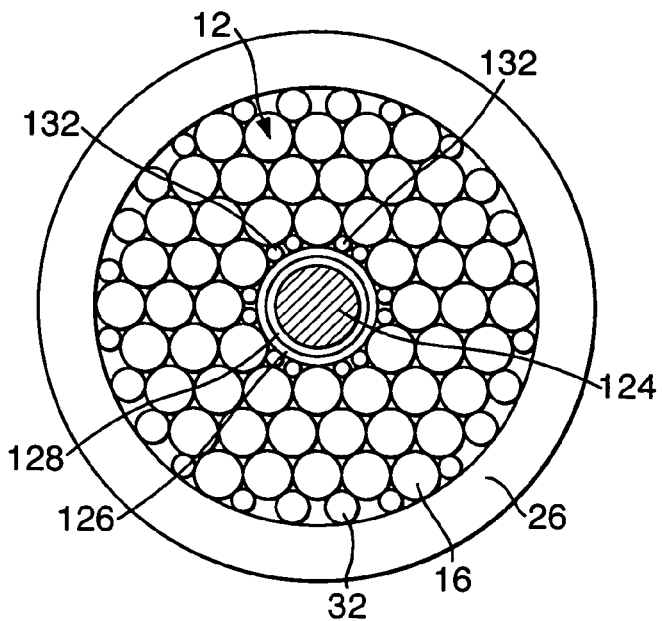
FIG. 5 is a top view of a further embodiment of a work piece holding arrangement.

Various modifications can be made without departing from the scope of the invention, for example, the clamping member may comprise an inner shaft 124 member having a radially outwardly deformable sleeve 126 to clamp the pins from the centre outwards, as shown in FIG. 5. An annular space 128 is defined between the shaft 124 and the sleeve 126 is provided to receive hydraulic fluid therein to deform the outwardly deformable sleeve 126.

A plurality of central elongate fill members 132 are provided adjacent the sleeve 126 to transmit the outward clamping force to the engagement members 12.

Figure 6:
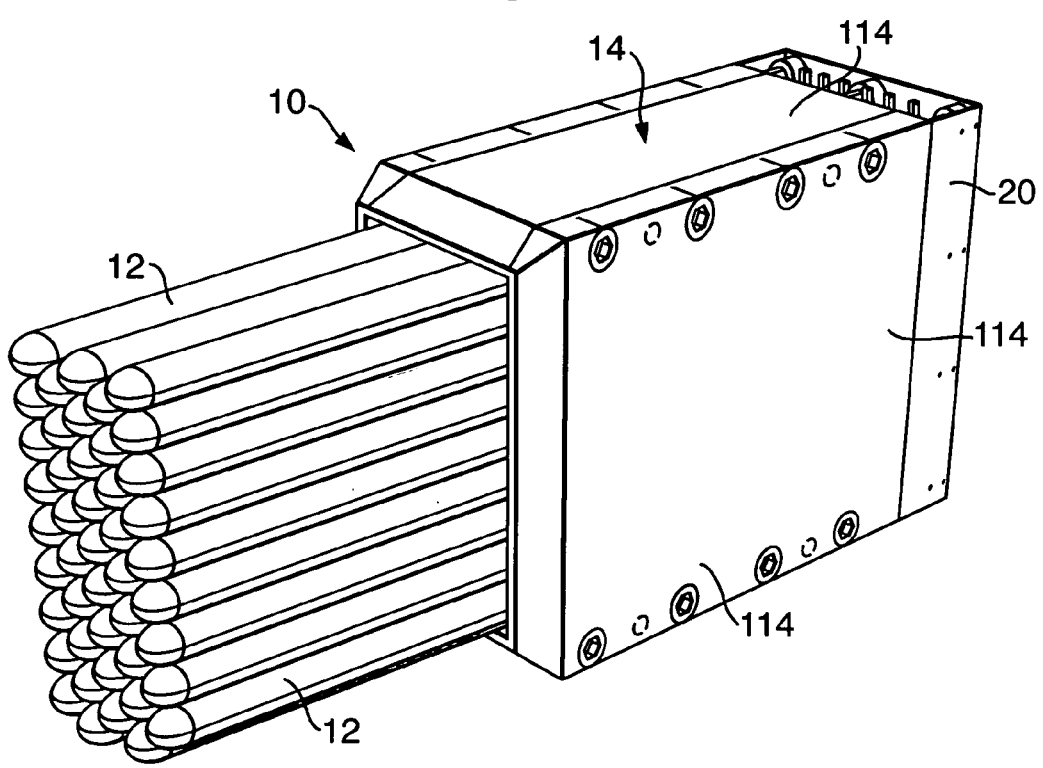
FIG. 6 is a perspective view of a further embodiment of a work piece holding arrangement.
Figure 7:
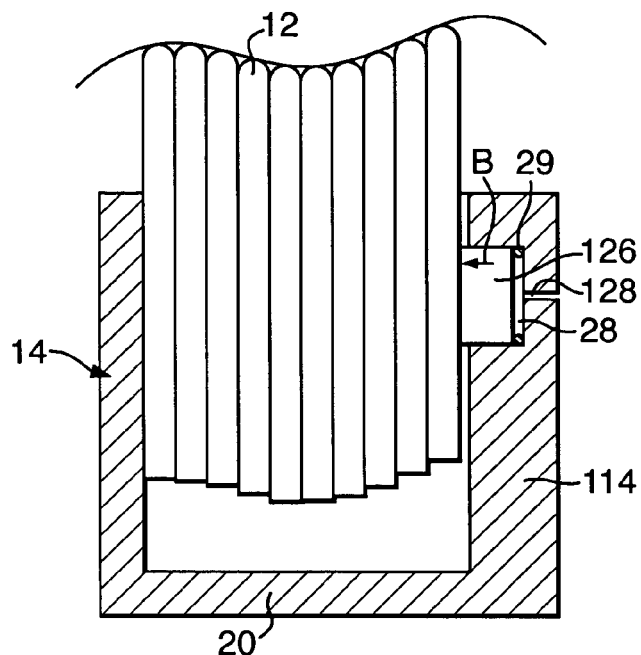
FIG. 7 is a sectional side view of the work piece holding arrangement shown in FIG. 6.

Another embodiment is shown in FIGS. 6 and 7 which is similar to the embodiment shown in FIGS. 1 to 4 and the same features have been designated with the same respective number. However, the embodiment shown in FIGS. 6 and 7 differ in that the support 14 is of a rectangular configuration, having four generally planar wall sections 124.

In the embodiment shown in FIGS. 6 and 7, the engagement elements 12 are arranged in a self-aligning pattern, which is of a rectangular configuration to correspond to the shape of the support 14.

The embodiment shown in FIGS. 6 and 7 also differs from the embodiment shown in FIGS. 1 to 4 in that a clamping strip 126 is used instead of the clamping bushing 26. The clamping strip 126 is provided across only one of the wall sections 114, but could be in at least one, or all, of the other wall sections 114 if higher clamping loads are required.

The clamping strip 126 is deformable inwardly, as shown by the arrow B by the introduction of hydraulic fluid via a hydraulic fluid conduit 128 into the rectangular space 28.

There is thus described three embodiments of a work piece holding arrangement 10 for holding a work piece such as a blade of a rotary component of a gas turbine engine, or a vane of a stationary component. The preferred embodiment includes an array of pneumatically or hydraulically actuated engaging elements 12 which are movable outwardly to engage the work piece. Each engaging element defines a pathway 48 for the flow of fluid therethrough, the pathway 48 having an outlet to atmosphere which allows the free flow of fluid through the pathway 48. This has the advantage in the preferred embodiment of gently moving the outer pin members 16 outwardly to lightly engage the work piece. Upon such engagement no, or very little, further force is applied to the work piece by the pin member 16. When the work piece us engaged by a plurality of the pin members 16, hydraulic fluid is supplied to the space 28, 128 to deform inwardly the bushing 26 or the strip 126 to clamp the pin members 16 in position.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A work piece holding arrangement comprising an array of movable engagement members for engaging a work piece, an actuator for moving a plurality of the engagement elements into engagement with the work piece, and a deformable clamping member to clamp the engagement elements, wherein the clamping member is deformable between a clamping condition in which at least some of the engagement elements are engaged by the clamping member and clamped in respective positions, and a non-clamping condition in which the engagement elements can move, each engagement element comprises an inner part and an outer part, the outer part being telescopically movable over the inner part, the inner and outer parts define a fluid path and each engagement element is movable by the flow of a fluid through the fluid path, and the actuator comprises a fluid supply assembly for supplying said fluid to each engagement element.

2. A work piece holding arrangement according to claim 1 including a support for supporting the engagement element in an outwardly extending array in which each engagement element is generally parallel with each other engaging element.

3. A work piece holding arrangement according to claim 1, wherein each engagement element comprises an elongate member movable in the elongate member's longitudinal direction.

4. A work piece holding arrangement according to claim 1, wherein the inner and outer parts of each engagement element comprise cooperable respective stop formations to inhibit the telescopic movement.

5. A work piece holding arrangement according to claim 1, wherein the fluid supply assembly comprises a pneumatic or hydraulic fluid supply assembly.

6. A work piece holding arrangement according to claim 1, wherein the inner part and the outer part each have a respective proximal end region and a respective distal end region wherein the proximal end regions of the inner and outer parts are nearer to the support than the respective distal end regions, and the fluid path extends from an inlet at the proximal end region of the inner part to an outlet at the proximal end region of the outer part.

7. A work piece holding arrangement according to claim 6, wherein the fluid path is substantially devoid of seals.

8. A work piece holding arrangement according to claim 7 having a narrow gap in the fluid path to generate a non-positive driving force on each outer part.

9. A work piece holding arrangement according to claim 6, wherein each engagement element comprises an inner tubular member defining a first region of the fluid path from the inlet, and an outer pin member defining a second region of the fluid path to the outlet, and the cooperable stop formations comprise an outwardly extending formation on the inner tubular member, and an inwardly extending formation on the outer pin member.

10. A work piece holding arrangement according to claim 9, wherein the outwardly extending stop formation is provided on the distal end region of the inner tubular member, and the inwardly extending stop formation is provided on the proximal end of the outer pin member.

11. A work piece holding arrangement according to claim 1 wherein the clamping member is deformable by the action of a fluid thereon.

12. A work piece holding arrangement according to claim 11 comprising a fluid flow arrangement to direct fluid to the clamping member to deform the clamping member to the clamping condition.

13. A work piece holding arrangement according to claim 1, wherein the clamping member comprises a clamping bushing extending around the engagement elements, the clamping bushing being deformable inwardly to the clamping condition to engage a plurality of the engagement elements.

14. A work piece holding arrangement according to claim 13, wherein the clamping bushing is of an annular configuration and surrounds the engaging elements.

15. A work piece holding arrangement according to claim 1, wherein the clamping member comprises a shaft member arranged centrally of the engagement element, the shaft member being deformable outwardly to the clamping condition to engage a plurality of the engagement elements.

16. A work piece holding arrangement according to claim 1, wherein the clamping member comprises a clamping strip extending along a generally planar wall member, the clamping strip being deformable towards the engagement elements to the clamping condition.

17. A work piece holding arrangement according to claim 1, including a securing means to secure the work piece on the engagement elements.

18. A work piece holding arrangement according to claim 17, wherein the securing means comprises a flexible sealing member for sealingly engaging the work piece and vacuum application means to apply a vacuum between the engagement elements.

19. A work piece holding arrangement according to claim 18, wherein the vacuum application means comprises a conduit extending through the support via which air can be removed.

20. An engagement element for use in a work piece holding arrangement comprising an inner part and an outer part, the inner and outer parts being telescopically movable relative to each other, wherein the inner and outer parts define a fluid path and the relative telescopic movement of the inner and outer parts is effected by a flow of a fluid through the fluid path.

21. An engagement element according to claim 20, wherein the fluid path extends through both of the inner and outer parts to allow fluid flowing through the fluid path to move the outer part over the inner part.

22. An engagement element according to claim 20, wherein the inner and outer parts comprise cooperable respective stop formations to inhibit the telescopic movement.

23. An engagement element according to claim 20, wherein the inner part and the outer part each have a respective proximal end region and a respective distal end region wherein the proximal end regions of the inner and outer parts are nearer to the support than the respective distal end regions, and the fluid path extends from an inlet at the proximal end region of the inner part to an outlet at the proximal end region of the outer part.

24. An engagement element according to claim 23, wherein the fluid path is substantially devoid of seals.

25. An engagement element according to claim 24 having a narrow gap in the fluid path to generate a non-positive driving force on the outer part.

26. An engagement element according to claim 23, wherein each engagement element comprises an inner tubular member defining a first region of the fluid path from the inlet, and an outer pin member defining a second region of the fluid path to the outlet, and the cooperable stop formations comprise an outwardly extending formation on the inner tubular member, and an inwardly extending formation on the outer pin member.

27. An engagement element according to claim 26, wherein the outwardly extending stop formation is provided on the distal end region of the inner tubular member, and the inwardly extending stop formation is provided on the proximal region end of the outer pin member.

* * * * *